United States Patent
Kim et al.

(10) Patent No.: US 12,155,558 B2
(45) Date of Patent: Nov. 26, 2024

(54) METHOD, COMPUTER DEVICE, AND NON-TRANSITORY COMPUTER-READABLE RECORDING MEDIUM FOR PROVIDING OPTIMAL PATH USING EXPERT KNOWLEDGE

(71) Applicant: NAVER CORPORATION, Seongnam-si (KR)

(72) Inventors: Young-Bum Kim, Bellevue, WA (US); Gun Su Lee, Seongnam-si (KR); Dongchan Kim, Bellevue, WA (US); Sun Kim, Bellevue, WA (US); Jinmyung Won, Bellevue, WA (US); Hongyeon Yu, Seongnam-si (KR); Chanhee Lee, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 0 days.

(21) Appl. No.: 18/053,041

(22) Filed: Nov. 7, 2022

(65) Prior Publication Data
US 2023/0353487 A1 Nov. 2, 2023

Related U.S. Application Data

(60) Provisional application No. 63/363,877, filed on Apr. 29, 2022.

(51) Int. Cl.
*H04L 45/24* (2022.01)
*G01C 21/36* (2006.01)
(Continued)

(52) U.S. Cl.
CPC .......... *H04L 45/24* (2013.01); *G01C 21/3691* (2013.01); *G06F 16/9535* (2019.01);
(Continued)

(58) Field of Classification Search
CPC .......... H04L 45/24; H04L 45/12; H04L 41/15
See application file for complete search history.

(56) References Cited

U.S. PATENT DOCUMENTS 9,661,088 B2 * 5/2017 Krishnamoorthy ..... H04L 67/02
10,424,302 B2 * 9/2019 Shah ...................... H04L 51/02
(Continued)

FOREIGN PATENT DOCUMENTS

KR 101647364 B1 8/2016

OTHER PUBLICATIONS

Hsu et al., "RetaGNN: Relational Temporal Attentive Graph Neural Networks for Holistic Sequential Recommendation" The Web Conference 2021, Apr. 19-23, 2021, Ljublana, Slovenai, ACM Publishing.*

(Continued)

*Primary Examiner* — Todd L Barker
(74) *Attorney, Agent, or Firm* — Greer Burns & Crain Ltd.

(57) ABSTRACT

A method for providing an optimal path through a computer network includes predicting a subsequent action of a target user through an optimal path prediction model that is trained in a form of a graph representing a user action trajectory of a session unit and recommending a path of the predicted action as an optimal path. The recommendation includes identifying a user intent based on a previous action trajectory of the target user in a current session, and guiding a path corresponding to the user intent as one of the optimal paths.

20 Claims, 17 Drawing Sheets

(51) Int. Cl.
  *G06F 16/9535* (2019.01)
  *G06N 3/092* (2023.01)
  *G06Q 30/0601* (2023.01)
  *H04L 41/16* (2022.01)
  *H04L 67/50* (2022.01)

(52) U.S. Cl.
  CPC ......... *G06N 3/092* (2023.01); *G06Q 30/0625* (2013.01); *H04L 41/16* (2013.01); *H04L 67/535* (2022.05)

(56) References Cited

U.S. PATENT DOCUMENTS

| | | | | |
|---|---|---|---|---|
| 11,120,458 | B2* | 9/2021 | Tian | H04W 4/021 |
| 11,194,966 | B1* | 12/2021 | Appel | G06F 40/44 |
| 11,315,551 | B2* | 4/2022 | Penta | G10L 15/063 |
| 11,423,439 | B2* | 8/2022 | Brandstetter | G06F 16/9536 |
| 2013/0138586 | A1* | 5/2013 | Jung | G06N 20/00 706/14 |
| 2015/0007065 | A1* | 1/2015 | Krishnamoorthy | G06F 3/0483 715/760 |
| 2018/0197428 | A1* | 7/2018 | Baphna | G09B 7/00 |
| 2018/0300393 | A1* | 10/2018 | Brandstetter | G06F 16/9538 |
| 2019/0115027 | A1* | 4/2019 | Shah | G10L 17/22 |
| 2019/0281407 | A1* | 9/2019 | Tian | G06F 16/9024 |
| 2020/0110623 | A1* | 4/2020 | Vangala | G06Q 10/06 |
| 2021/0027647 | A1* | 1/2021 | Baphna | G09B 5/00 |
| 2022/0198154 | A1* | 6/2022 | Liu | G06N 3/045 |
| 2022/0261662 | A1* | 8/2022 | Chandrasekar | G06N 5/02 |
| 2022/0344060 | A1* | 10/2022 | Kristal | G16H 50/50 |
| 2023/0233935 | A1* | 7/2023 | Blok | A63F 13/67 463/43 |

OTHER PUBLICATIONS

Bernardis et al., "From Data Analyis to Intent-Based Recommendationl an industrial Case Study in the Video Domain", Febraury 1, 2022.*
Li et al., "Dual Attentive Sequential Learning for Cross-Domain Click-Trhough Rate Prediction", Aug. 14, 2021, ACM Publishing.*
Requena et al., "Shopper Intent Prediction fro clickstream e-commerce data with minimal browsing information", Oct. 12, 2020.*
Simsek et al., "Knowledge Graph Lifecycle: Building and maintaining Knowledge Graphs", May 18, 2021.*
Klseleva et al., "Predicting Current User Intent with Contextual Markov Models", 2013 IEEE 13th International Conference on Data Mining Workshops, pp. 391-398, Dec. 2013.*
Shruthi et al., "Foundations of Expainable Knowledge-Enabled Systems", Mar. 17, 2020.*
C. C. White, "A Suvery on the Integratin of decision analysis and expert systems for decision support", IEEE Transactions on Systems, Man, and Cybernetics, vol. 20, Issue 2, pp. 358-364, Mar. 190.*
Ravi et al., "A Comparative Review of Expert Systems, Recommender Systems, and Explainable AI", 2022 IEEE International Conference for Convergence in Technology, pp. 108, Apr. 7, 2022.*
Kim et al.; U.S. Appl. No. 18/054,327, filed Nov. 10, 2022.

* cited by examiner

METHOD, COMPUTER DEVICE, AND NON-TRANSITORY COMPUTER-READABLE RECORDING MEDIUM FOR PROVIDING OPTIMAL PATH USING EXPERT KNOWLEDGE

BACKGROUND OF THE INVENTION

Field of Invention

One or more example embodiments of the present invention relate to technology for providing an optimal path by finding a pattern from a user action.

Description of Related Art

In a current situation in which a vast amount and types of contents are being serviced, services for recommending content to a user based on various criteria have appeared and a personalized recommendation service is most representative.

A personalized recommendation service refers to a service that recommends content suitable for a user, that is, personalized content based on an activity (e.g., a content use pattern, a content purchase pattern, etc.) of the user.

An existing method of the personalized recommendation service is a method of analyzing an activity pattern based on a previous activity of the user, searching for another user having an activity pattern similar to that of the user, and recommending content used or purchased by the retrieved other user to the user.

Korean Patent Registration No. 10-1647364 (registered on Aug. 4, 2016) describes technology for recommending content with higher suitability to a corresponding user by providing suitable content among a plurality of contents to a plurality of user groups based on score by user group based on an interaction of the plurality of users for each piece of content and priority based on a user group to which the corresponding user belongs.

BRIEF SUMMARY OF THE INVENTION

One or more example embodiments provide a method and apparatus that may recommend an optimal path to achieve a goal through a personalized model by modeling user experience.

One or more example embodiments provide a method and apparatus that may recommend a path to which expert knowledge is applied as an optimal path to achieve a user goal.

According to an aspect of at least one example embodiment, there is provided a method for providing an optimal path performed by a computer device including at least one processor configured to execute computer-readable instructions included in a memory, the method including, by the at least one processor, predicting a subsequent action of a target user through an optimal path prediction model that is trained in a form of a graph representing a user action trajectory of a session unit and recommending a path of the predicted action as an optimal path. The recommending includes identifying a user intent based on a previous action trajectory of the target user in a current session; and guiding a user through a path corresponding to the user intent as one of the optimal paths.

The guiding may include guiding an expert knowledge-based path by calling an expert-embedded artificial intelligence (AI) model corresponding to the user intent among expert-embedded AI models that are trained with a path determined as correct answer data in consideration of a rule defined as expert knowledge.

The optimal path prediction model may include an expert-embedded AI model that learns an expert knowledge-based path of a corresponding category with respect to each expert category, and the guiding may include guiding the expert knowledge-based path through an expert-embedded AI model of a category suitable for the user intent.

The path of the predicted action may include a state at each time step, an action in the state, and a reward for the action, and the state may be defined with contents related to a service screen consumed by a user and further includes at least one of a service type, user-related environmental information, user's personal information, and a session category, the action may be defined as a user activity in the state, and the reward may be defined as a user satisfaction for the action.

A relatively high reward may be applied to an expert knowledge-based path.

The guiding may include displaying an interface for guiding an expert knowledge-based path on a service screen of the current session.

The guiding may further include requesting a user input related to the user intent through an interface for guiding the expert knowledge-based path.

The guiding may further include providing additional information corresponding to the user input as the expert knowledge-based path.

The guiding may include defining a current state of the target user and guiding a personalized path based on the current state.

The current state of the target user may be defined as at least one of a user action history of the target user in a current session or a recent desired period, user's environmental information, and user's personal information.

According to an aspect of at least one example embodiment, there is provided a non-transitory computer-readable recording medium storing instructions that, when executed by a processor, cause the processor to implement the method.

According to an aspect of at least one example embodiment, there is provided a computer device including at least one processor configured to execute computer-readable instructions included in a memory. The at least one processor is configured to predict a subsequent action of a target user through an optimal path prediction model that is trained in a form of a graph representing a user action trajectory of a session unit and recommending a path of the predicted action as an optimal path, identify a user intent based on a previous action trajectory of the target user in a current session and guide a user through a path corresponding to the user intent as one of the optimal paths.

According to some example embodiments, it is possible to find a pattern from a user action using an AI model and to recommend an optimal path to a user destination capable of skipping unnecessary steps.

According to some example embodiments, it is possible to build a hyper-personalized model for optimal path prediction and to build a platform that does not depend on a specific domain or service by representing user experience as a path and modeling the same.

According to some example embodiments, it is possible to guide a user through an optima user experience capable of further quickly reaching a user destination by recommending a path represented as expert knowledge as a path suitable for a user intent.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
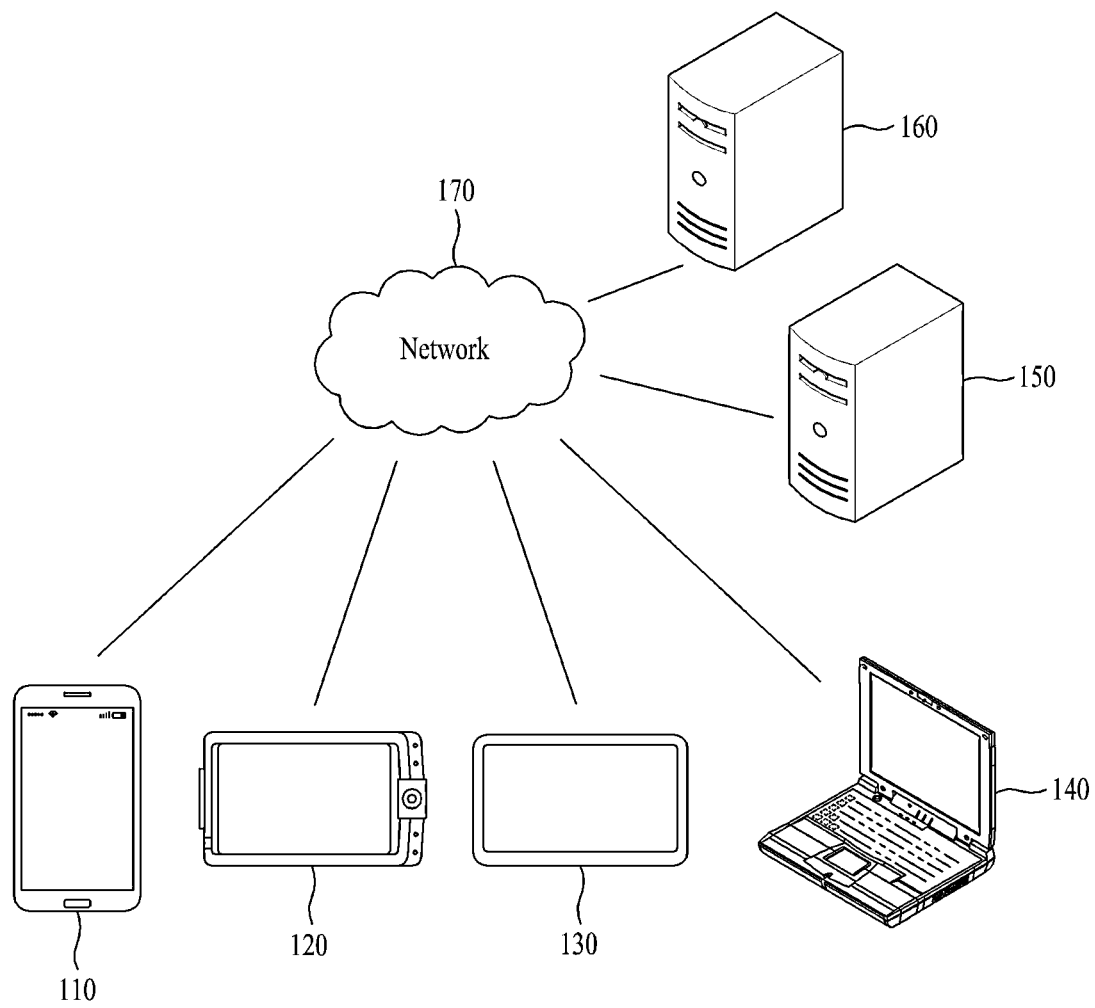
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings. The example embodiments relate to technology for providing an optimal path or navigation through various user services, such as search services, shopping services, map services, blog services, advertisement services, payment services, etc., provided on a computer network by finding a pattern from actions taken by the user while interfacing or interacting with these services.

The example embodiments set forth herein may recommend an optimal path for achieving a user goal as a path on a platform in which a plurality of services is linkable.

An optimal path recommendation system according to the example embodiments may be implemented by at least one computer device and an optimal path recommendation method according to the example embodiments may be performed by the at least one computer device included in the optimal path recommendation system. Here, a computer program according to an example embodiment may be installed and executed on the computer device, and the computer device may perform the optimal path recommendation method according to the example embodiments under control of the executed computer program. The aforementioned computer program may be stored in a computer-readable storage medium to computer-implement the optimal path recommendation method in conjunction with the computer device.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. The number of electronic devices or the number of servers is not limited thereto. Also, the network environment of FIG. 1 is provided as an example among environments applicable to the example embodiments and the environment applicable to the example embodiments is not limited to the network environment of FIG. 1.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet personal computer (PC), and the like. For example, although FIG. 1 illustrates a shape of a smartphone as an example of the electronic device 110, the electronic device 110 used herein may refer to one of various types of physical computer devices capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides a service, for example, a personalized recommendation service, to the plurality of electronic devices 110, 120, 130, and 140 connected over the network 170.

Figure 2:
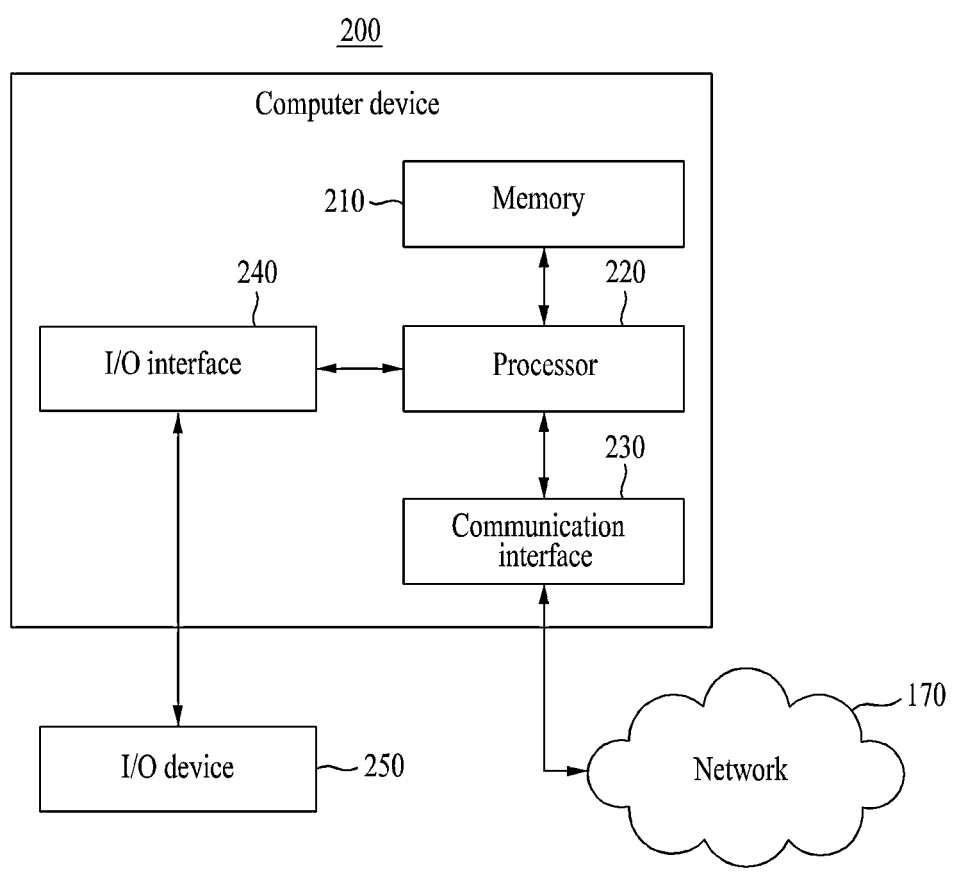
FIG. 2 is a diagram illustrating an example of a computer device according to at least one example embodiment.

FIG. 2 is a block diagram illustrating an example of a computer device according to at least one example embodiment. Each of the plurality of electronic devices 110, 120, 130, and 140 of FIG. 1 or each of the servers 150 and 160 may be implemented by a computer device 200 of FIG. 2.

Referring to FIG. 2, the computer device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable record medium. A permanent mass storage device, such as ROM and a disk drive, may be included in the computer device 200 as a permanent storage device separate from the memory 210. Also, an OS and at least one program code may be stored in the memory 210. Such software components may be loaded to the memory 210 from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 210 through the communication interface 230, instead of the non-transitory computer-readable record medium. For example, the software components may be loaded to the memory 210 of the computer device 200 based on a computer program installed by files received over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer device 200 and another apparatus, for example, the aforementioned storage devices. For example, the processor 220 of the computer device 200 may forward a request or an instruction created based on a program code stored in the storage device such as the memory 210, data, and a file, to other apparatuses over the network 170 under the control of the communication interface 230. Inversely, a signal, an instruction, data, a file, etc., from another apparatus may be received at the computer device 200 through the communication interface 230 of the computer device 200. For example, a signal, an instruction, content, data, etc., received through the communication interface 230 may be forwarded to the processor 220 or the memory 210, and a file, etc., may be stored in a storage medium, for example, the permanent storage device, further includable in the computer device 200.

The I/O interface 240 may be a device used for interfacing with an I/O device 250. For example, an input device of the I/O device 250 may include a device, such as a microphone, a keyboard, a mouse, etc., and an output device of the I/O device 250 may include a device, such as a display, a speaker, etc. As another example, the I/O interface 240 may be a device for interfacing with an apparatus in which an input function and an output function are integrated into a single function, such as a touchscreen. The I/O device 250 may be configured as a single apparatus with the computer device 200.

According to other example embodiments, the computer device 200 may include greater or less number of components than those shown in FIG. 2. For example, the computer device 200 may include at least a portion of the I/O device 250, or may further include other components, for example, a transceiver, a database, etc.

Hereinafter, example embodiments of a method and apparatus for providing an optimal path for achieving a user goal are described.

The example embodiments may provide an optimal composable experience action network (hereinafter, an "OCEAN model") capable of providing optimal experience to a user by training an artificial intelligence (AI) model based on an action pattern of a user and easily composing or expanding user experience between services.

The example embodiments may build a platform that does not depend on a specific domain or service through the OCEAN model. Herein, the platform may represent an incorporated platform that includes a multi-domain, a cross-platform, and the like to provide a path in a computer network in which a large number of services is linked.

The computer device 200 may provide a client with a personalized recommendation service through access to a dedicated application installed on the client computer or a website/mobile site related to the computer device 200. An optimal path recommendation system implemented as a computer may be configured in the computer device 200. For example, the optimal path recommendation system may be configured in a form of a program that independently operates or may be configured in an in-app form of a specific application to be operable on the specific application.

The processor 220 of the computer device 200 may be implemented as a component for performing the following optimal path recommendation method. Depending on example embodiments, the components of the processor 220 may be selectively included in or excluded from the processor 220. Also, depending on example embodiments, the components of the processor 220 may be separated or merged for functional representation of the processor 220.

The processor 220 and the components of the processor 220 may control the computer device 200 to perform operations included in the following optimal path recommendation method. For example, the processor 220 and the components of the processor 220 may be implemented to execute an instruction according to a code of at least one program and a code of an OS included in the memory 210.

Here, the components of the processor 220 may be representations of different functions performed by the processor 220 in response to an instruction provided from a program code stored in the computer device 200.

The processor 220 may read a necessary instruction from the memory 210 to which instructions related to control of the computer device 200 are loaded. In this case, the read instruction may include an instruction for controlling the processor 220 to execute the following operations.

Operations included in the following optimal path recommendation method may be performed in order different from illustrated order. A portion of operations may be omitted or an additional process may be further included.

Figure 3:
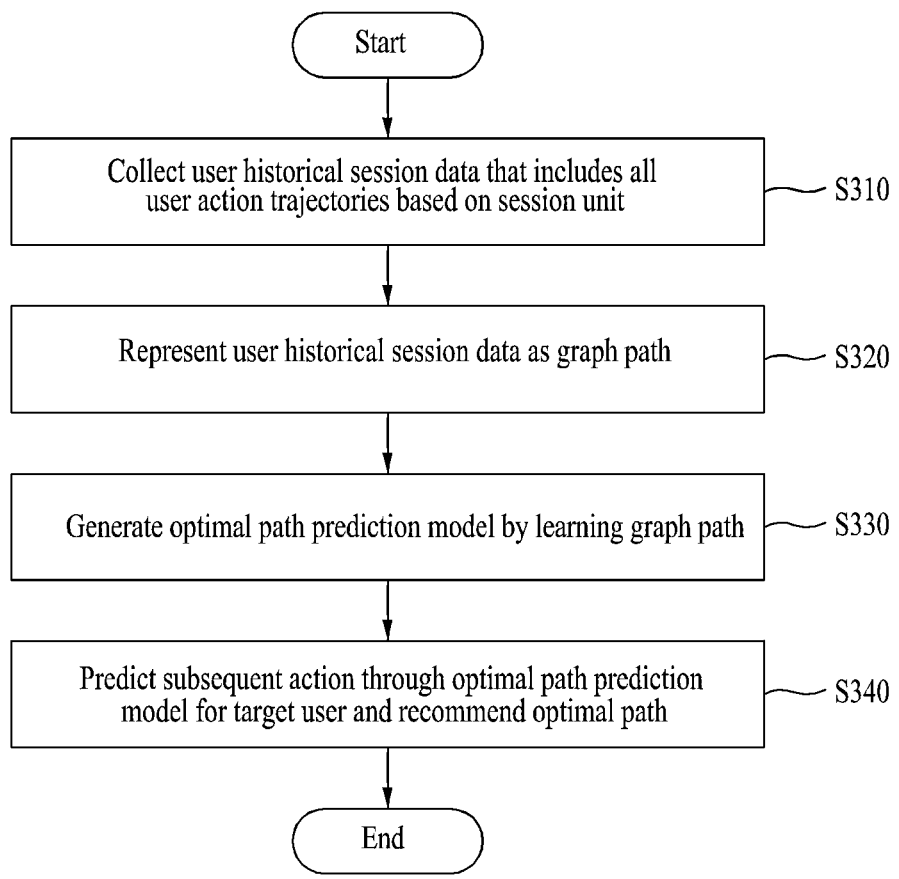
FIG. 3 is a flowchart illustrating an example of an optimal path providing method performed by a computer device according to at least one example embodiment.

FIG. 3 is a flowchart illustrating an example of a method performed by a computer device for recommending an optimal path through various user services on a computer network according to at least one example embodiment.

Referring to FIG. 3, in operation S310, the processor 220 may collect user historical session data that includes all user action trajectories in a corresponding session based on a session unit for each user. The processor 220 may track a user action for each session or time period on a computer network, may collect a series of all experiences in the corresponding session as a single set of sample data, and may use the same as training data for model training.

In operation S320, the processor 220 may represent user historical session data for each session as a graph path. The processor 220 may represent each piece of the user historical session data of a session unit as at least one path. Here, each path may include a state, an action, and a reward. The state may represent a current state of a user (contents consumed by the user on a screen provided from a service) at each time step, the action may represent a user activity or interface on a computer in a current state, such as click, scroll, go back, and search again, and the reward may represent a satisfaction of the user for a state acquired with the action, that is, a state-action pair.

In operation S330, the processor 220 may generate an OCEAN model that is a model for optimal path prediction by learning user experience that is represented as the graph path. The processor 220 may connect linkable services in a network form based on a multi-domain or a cross-platform. The user experience collected with a user log for the service may be represented as a graph path of a network. Here, the processor 220 may train a model using a path history, an action for each state, and a reward for each path.

In operation S340, the processor 220 may predict a subsequent action of the user through the OCEAN model for user historical session data collected in a current session of the target user and may recommend an optimal path in the network. The processor 220 may predict a subsequent action using a previous path history according to a user login in a current session for a target user that uses at least one service among services connected over the network and may recommend a path of the predicted action as the optimal path.

The OCEAN model according to the example embodiment refers to directly modeling the user experience and may include user experience related to at least one service. The OCEAN model may be built with a composable graph path structure and may have excellent expandability and knowledge of an expert may also be expressed as a path in the network. Also, the OCEAN model is a hyper-personalized model that may guide the user through continuous experience to achieve an optimal goal.

The example embodiments may learn user historical session data of a session unit in which a goal is defined by the user and may find a goal of the target user based on an action of the target user in a current session among a plurality of learned goals.

Figure 4:
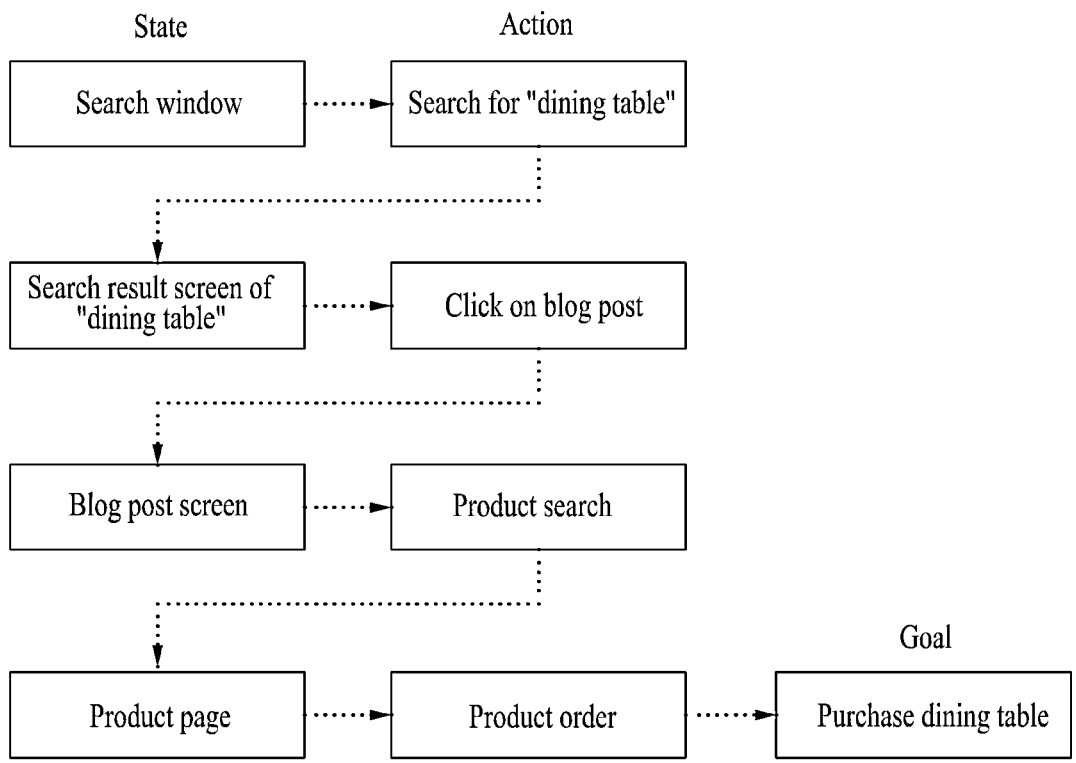
FIGS. 4 and 5 illustrate examples of a user experience scenario according to at least one example embodiment.
Figure 5:
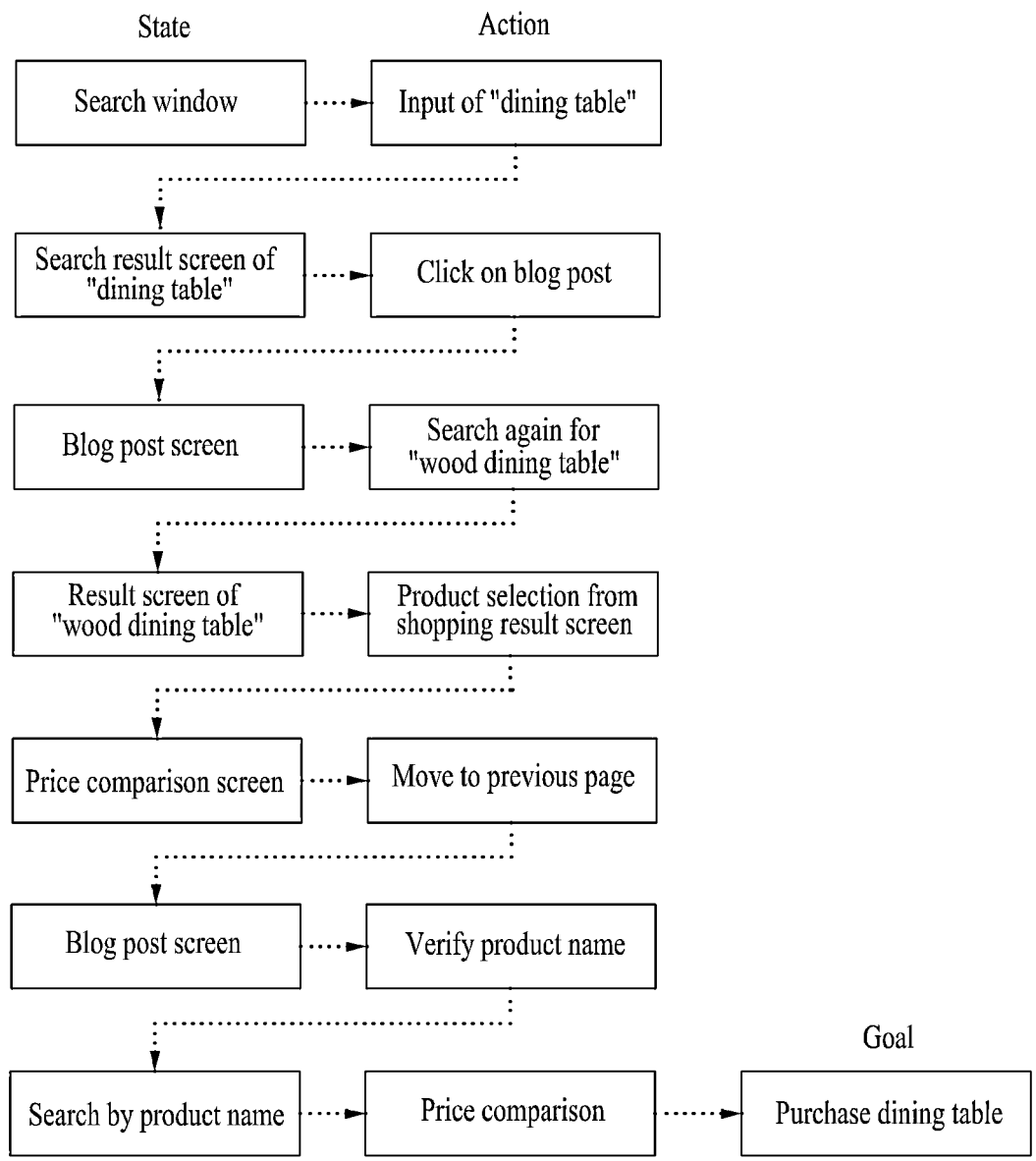

FIGS. 4 and 5 illustrate examples of a user experience scenario according to at least one example embodiment.

FIG. 4 illustrates a series of scenarios of searching for a dining table from a search window to achieve a specific goal of "purchase dining table," clicking a blog post on a search result screen of an electronic device, searching for a product name verified from the blog post, going to a product page of the found product, and ordering the product.

Meanwhile, FIG. 5 illustrates an example of a scenario of going through more processes to achieve the same goal as that of FIG. 4.

The user repeats a state and an action to achieve a goal. Here, the state may be defined as a current user state that represents contents of a service screen and the action may be defined as a user activity such as click, scroll, go back, and search again.

In the example embodiment, a linkable service is connectable in a form of a network. User experience in the network may be expressed as a path on the network and a model may be trained using path history, an action for each state, and a reward for each path. Such trained model may predict a subsequent action of the user and may guide the user to achieve a goal through an optimal path by connecting predicted actions.

Figure 6:
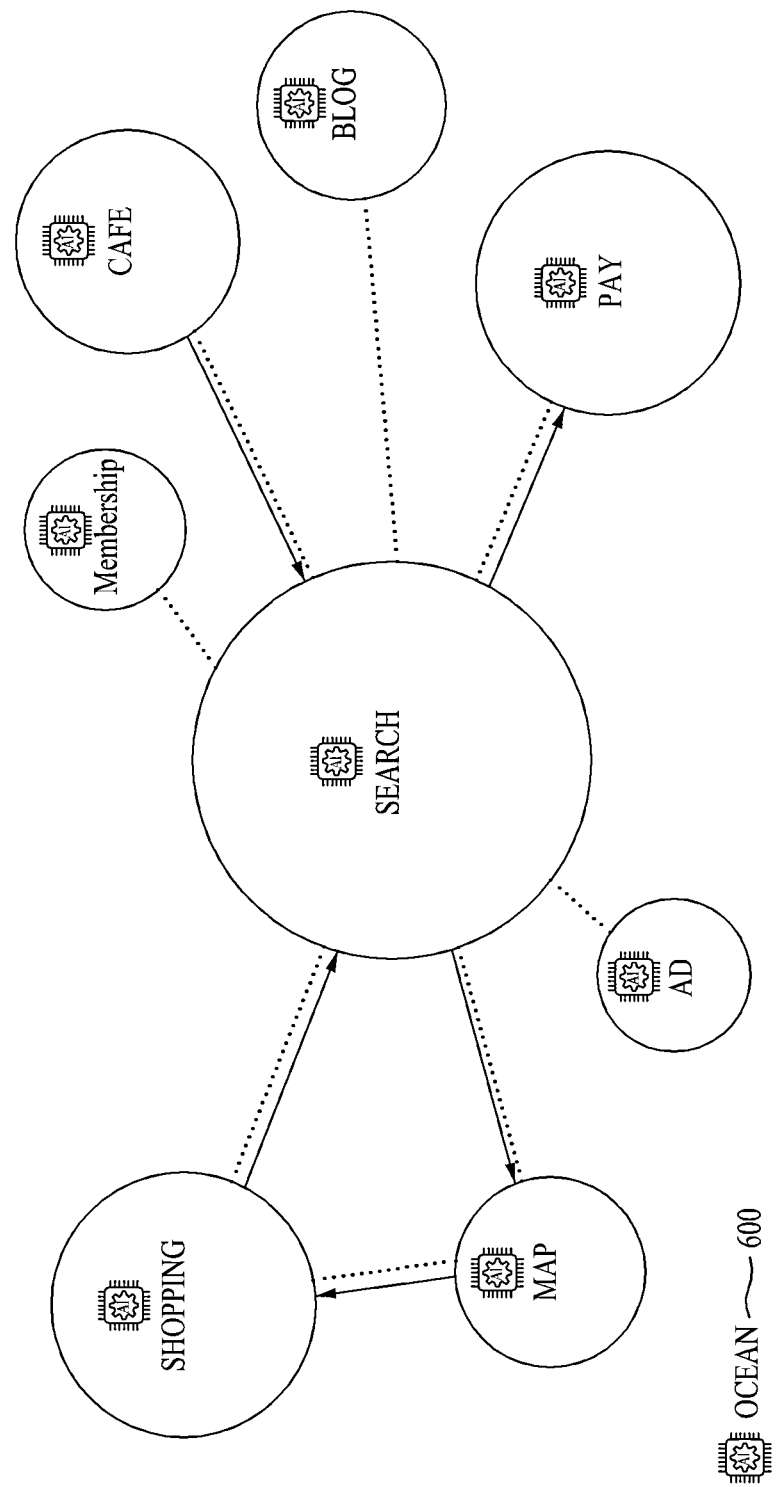
FIG. 6 illustrates an example of a service connected in a network form according to at least one example embodiment.

For example, referring to FIG. 6, various services, such as a search service, a map service, a shopping service, a simple pay service, a blog service, an advertising (AD) service, and the like, may be connected as linkable services over a single network.

A path for user experience may be generated in various services and an OCEAN model 600 for optimal path prediction may be built through learning that includes all of paths of services connected in the form of the network.

Figure 7:
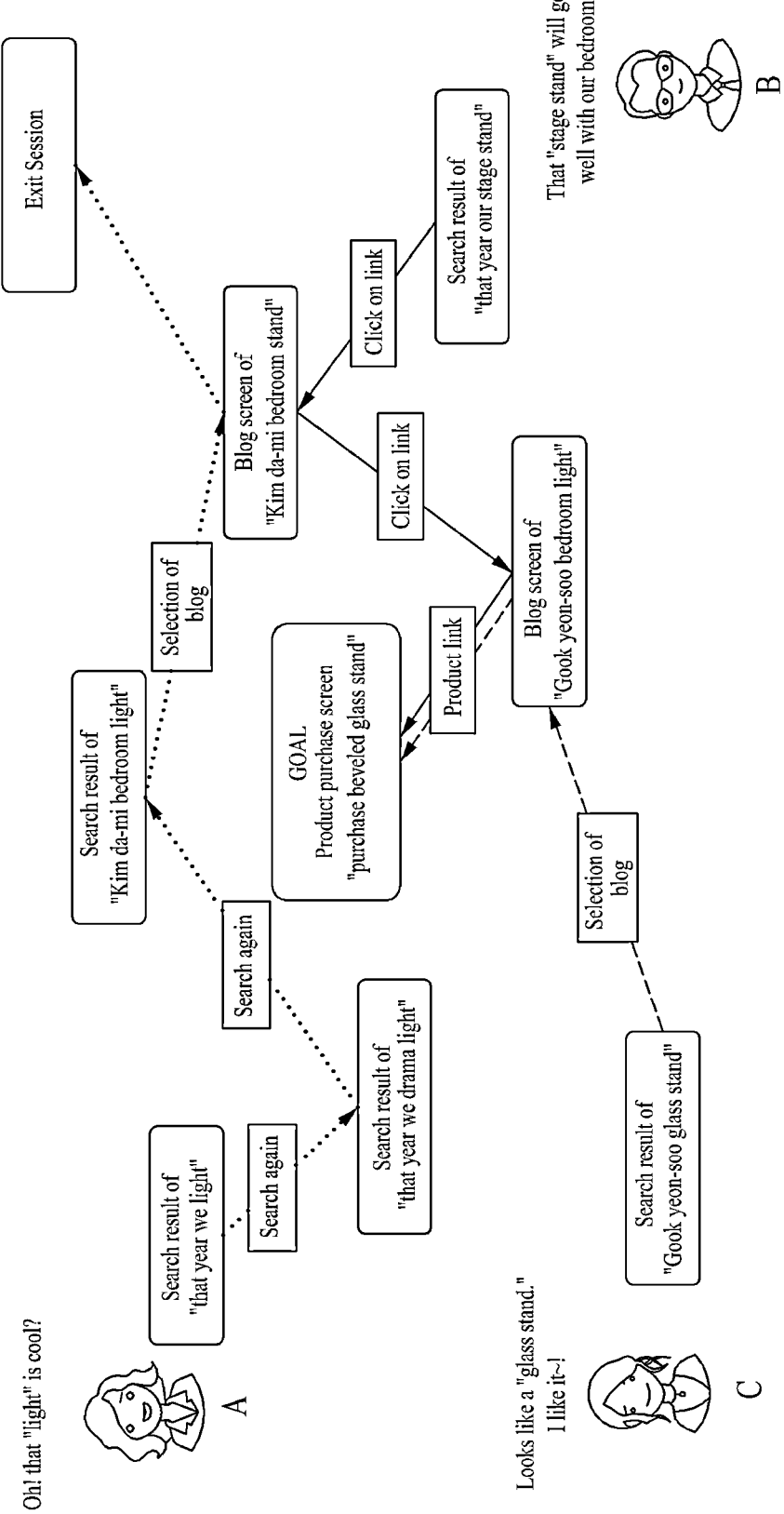
FIG. 7 illustrates an example of a graph path that represents user historical session data according to at least one example embodiment.

FIG. 7 illustrates an example of a graph path that represents user historical session data according to at least one example embodiment.

User A, user B, and user C that desire to purchase the same product may have the same goal to achieve, but may have different processes (user experience scenarios) to reach the corresponding goal. When a result of representing user experience of three people for achieving the goal as a network is as shown in FIG. 7, various paths may be drawn as each user goes through a different process. It can be seen that user A failed in purchasing the desired product and the user C that knows the product most specifically succeeded in purchasing the product through a shortest path among three users.

The example embodiment may generate the OCEAN model 600 capable of predicting an optimal path among a plurality of paths by learning user experience configured as a graph path and may recommend the same path as that of user C to another user and may guide the other user to achieve the goal.

Figure 8:
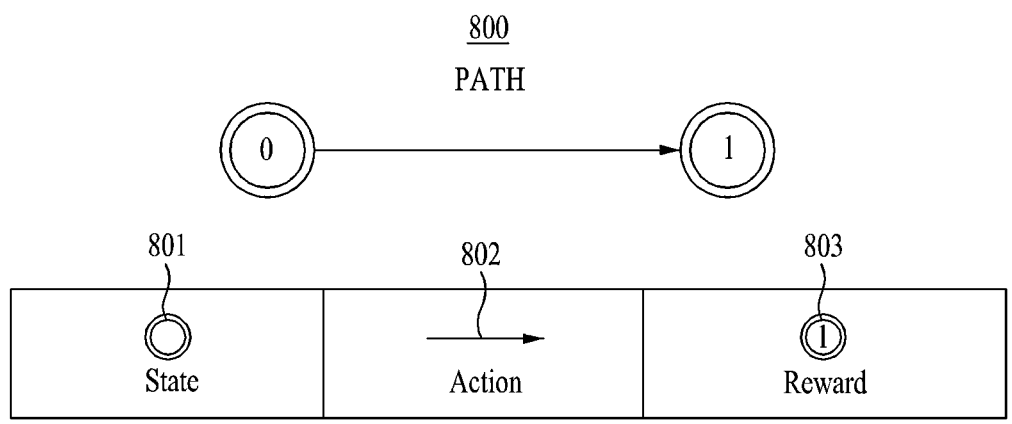
FIG. 8 illustrates an example of a path configuration that represents user experience according to at least one example embodiment.

FIG. 8 illustrates an example of a path configuration that represents user experience according to at least one example embodiment.

Referring to FIG. 8, a network of the OCEAN model 600 may include at least one path 800, and each path may include a state 801 at each time step, an action 802 for the state 801, and a reward 803 for the action 802.

The state 801 may be defined for all the service screens provided to a user in all linkable services; all possible activities (e.g., click, search, brows, etc.) that users may take for each service may be defined as the action 802; and the reward 803 may be designed based on satisfaction for the action 802.

The state 801 may be defined by including all the elements capable of determining a user state. The state 801 may include a service screen that the user is viewing at a current time step, a service type (e.g., search, shopping, map, blog, etc.), environment information (e.g., time, location, weather, etc.), user's personal information (e.g., age, gender, taste, etc.), session category (e.g., interior, fashion, vehicle, etc.), and the like. Through this, it is possible to provide a service that recommends a personalized optimal path.

The state 801 may be classified into a service state, an environment state, a user state, a session state, and the like, and may include various variables that represent a current state, for example, a current query, age, current screen, location, and time.

The action 802 refers to a user action and may include a query (e.g., text, image, voice, etc.), gesture (e.g., view, click, scroll, go back, favorite, etc.), and the like.

The reward 803 refers to a user satisfaction for the action 802. For example, the reward 803 may be determined by directly receiving feedback from the user and by directly measuring satisfaction to the action 802. As another example, the reward 803 may be determined through an indirect method of predicting satisfaction for the action 802 based on an additional action, such as a page dwell time, product purchase, and page click.

When all user logs in a single session are generated as a graph, the user experience may be expressed as various paths 800. The user experience in all linkable services without depending on a specific service may be expressed as the path 800 that includes the state 801, the action 802, and the reward 803. In this manner, a platform that does not depend on a specific domain or service may be built by modeling the user experience itself.

All sets of trials and errors (i.e., including both success experience and failure experience) to achieve a goal may be used as training data.

For example, an example of user experience connected to a correct answer knowledge panel service is provided in Table 1. Such user experience includes correcting a typo or inputting a query suitable for more desired information.

TABLE 1

| | |
|---|---|
| User experience of finding correct answer of a country code | est district -> est country -> est nation -> Estonia -> success<br>est country code -> est nation -> Estonia -> success<br>est -> Espana -> est nation -> Estonia -> success<br>est -> Espana -> fail<br>. . . |
| User experience of finding recent works of two celebrities | Jung woo-sung Hwang jung-min -> Jung woo-sung Hwang jung-min movie -> Asura -> success<br>Jung woo-sung's movie with Hwang jung-min -> Asura -> success<br>Movie with Hwang jung-min and Jung woo-sung -> movie with both Hwang jung-min Jung woo-sung -> Asura -> success<br>Movie with both Hwang jung-min and Jung woo-sung -> veteran -> fail<br>. . . |
| User experience of finding a correct song for a certain lyric | It's getting darker -> moon embracing the sun ost -> go back in time -> success<br>It's getting darker -> moon embracing the sun ost -> the moonlight goes down -> fail<br>. . . |
| . . . | . . . |

The user experience examples may be collected and defined as the state 801, the action 802, and the reward 803 to train the model.

Examples of the state 801 and the action 802 are provided as follows:

TABLE 2

| state-user action result screen | action-user action |
|---|---|
| Integrated search result | Search or search again |
| Specific collection search result | Scrolling |
| Map screen result | Click on document |
| Shopping screen result | Click on purchase button |
| ... | Click on go back button |
| | ... |

The reward 803 may be defined as a user satisfaction to the action 802.

For example, the reward 803 may be determined based on a click-through rate (CTR) and may be applied as a positive indicator when there are many user clicks versus exposure in the state 801.

As another example, the reward 803 may be determined based on a probability of clicking on a specific collection, document, point, and the like. The reward 803 may be applied as a positive indicator when many users click on similar locations and may be applied as a negative indicator when click locations of users are distributed.

As another example, the reward 803 may be determined based on a dwell time, may be applied as a positive indicator when the dwell time is greater than or equal to a desired period of time in the state 801, and may be applied as a negative indicator when the dwell time is less than or equal to the desired period of time in the state 801.

As another example, the reward 803 may be determined based on a dwell time difference, may be applied as a positive indicator when a dwell time of a current state is greater than a dwell time of a previous state, and may be applied as a negative indicator when the dwell time of the current state is less than the dwell time of the previous state.

As another example, the reward 803 may be determined based on scrolling, and may be applied as a positive indicator when scrolling is small and stays in one portion for a long period of time and may be applied as a negative indicator when there is a lot of meaningless scrolling.

As another example, the reward 803 may be determined based on an action pair count, may be applied as a positive indicator when a number of cases in which a previous action and a current action simultaneously appear is greater than or equal to a certain level, and may be applied as a negative indicator when the number of cases in which the previous action and the current action simultaneously appear is less than the certain level.

As another example, the reward 803 may be determined based on an action transition probability, may be applied as a positive indicator when a transition probability from the previous action to the current action is greater than or equal to the certain level, and may be applied as a negative indicator when the transition probability from the previous action to the current action is less than the certain level.

As another example, the reward 803 may be determined based on a probability that the current action is the last action of the session, may be applied as a positive indicator when many users terminate the session in the current state, and may be applied as a negative indicator when many users take another action in the current state.

Here, when determining the reward 803, an indicator corresponding to a service type may be applied. For example, in the case of a shopping service, the reward 803 may be determined based on a CTR of a purchase button. In the case of a map service, the reward 803 may be determined based on a CTR of a corresponding company.

For example, a case of defining [est district→est country→est nation→Estonia→success] as the state 801, the action 802, and the reward 803 in user experience of finding a correct answer of est country code is provided as the following Table 3:

TABLE 3

| Query sequence | est district -> est country -> est nation -> Estonia -> success |
|---|---|
| Detailed sequence | action 0: search (est district) -> state 0: search result |
| | reward 0: ctr, dwell, ... |
| | action 1: search again (est country) -> state 1: search result |
| | reward 1: ctr, dwell, ... |
| | action 2: search again (est nation) -> state 2: search result |
| | reward 2: ctr, dwell, ... |
| | action 3: click on document -> state 3: contents of clicked document |
| | reward 3: dwell time ... |
| | action 3: search again (Estonia) -> state 3: search result |
| | reward 3: ctr, dwell, ... |

When a reward for a last state of a session is greater than or equal to a certain level, it may be used as success experience. When the reward for the last state of the session is less than or equal to the certain level, it may be used as failure experience.

That is, for training the OCEAN model 600, user historical session data that includes all action trajectories in a corresponding session based on a session unit may be used as training data. The training data may be appropriately processed and used according to a service situation or a model training method. For example, in the case of a search query, a query may be defined as the action 802. In the case of a shopping service, a click may be defined as the action 802. In the case of applying language modeling learning, all of the state 801 and the action 802 may be represented and used with languages.

The processor 220 may build the OCEAN model 600 by learning the path 800 that represents a current state of the user at each time step in a corresponding session as the state 801, an activity of the user as the action 802, and a satisfaction of the user as the reward 803.

For example, the processor 220 may generate the OCEAN model 600 through reinforcement learning based on the state 801, the action 802, and the reward 803. As another example, the processor 220 may generate the OCEAN model 600 through language modeling learning that understands the state 801, the action 802, and the reward 803 as a language. As another example, the processor 220 may generate the OCEAN model 600 through neural network learning for the path 800 in a graph structure that includes the state 801, the action 802, and the reward 803. Depending on example embodiments, the OCEAN model 600 may be generated through ensemble learning using at least two models.

A reinforcement learning-based model training process may be as follows.

As one of the definitions for reinforcement learning, a Markov decision process (MDP) may be defined as a tuple $(S, A, \tau, r, \gamma, \mu)$. Here, S and A denote a set of states and a set of actions, respectively. T maps any $s, a \in S \times A$ to a conditional distribution $\tau(\cdot | s, a)$ over state(S) and r maps any $s, a \in S \times A$ to $r(s,a) \in [0,1]$. $\Gamma \in [0,1]$ denotes a discount factor and $\mu$ denotes a distribution over state($S$).

Also, a generalized policy $\pi_\theta$ parameterized by $\theta \in \mathbb{R}^d$ defines a conditional distribution $\pi_\theta(\cdot|s,h)$ over action($A$). Here, $s \in S$ denotes a current state, and $h$ denotes any additional information to condition on (e.g., a past state-action-reward history).

Also, a value function $V: \theta \mapsto \mathbb{R}$ associated with the MDP $(S, A, \tau, r, \gamma, \mu)$ and the policy $\pi_\theta$ is represented as Equation 1.

$$V(\theta) = \underset{\substack{s_0 \sim \mu \\ a_t \sim \pi_\theta(\cdot|s_t, h_t), s_{t+1} \sim \tau(\cdot|s_t, a_t) \forall t=0,1,2,\ldots}}{E} \left[ \sum_{t=0}^{\infty} \gamma^t r(s_t, a_t) \right] \quad \text{[Equation 1]}$$

The purpose of reinforcement learning is to find a policy of maximizing the value function $V(\theta)$.

The processor 220 may indirectly perform policy learning by estimating a maximal reward (Q function) at each state-action pair from which an optimal policy may be extracted. Here, a learning algorithm is based on temporal difference (TD) learning and may use a model-based (i.e., requires the knowledge of a reward function and a state transition distribution) method, or a model-free (does not require knowledge) method such as Q-learning.

If the policy is differentiable, the value function $V(\theta)$ may be optimized using a gradient-based method. The example embodiment may solve a flat gradient issue caused due to sparse signals mainly by preconditioning/regularizing an ascent direction (natural gradient, TRPO, and PPO).

The processor 220 may directly model a sequence of states, actions, and rewards in consideration of offline reinforcement learning as sequence modeling. A user action trajectory in a session may be constructed with a static dataset on which any sequence model may be trained. A decision transformer for sequence modeling is given as Equation 2.

$$\pi_\theta(a_t|(R_0, s_0, a_0) \ldots (R_{t-1}, s_{t-1}, a_{t-1}), (R_t, s_t)) \quad \text{[Equation 2]}$$

Here, $R_t$ denotes "returns-to-go (sum of future rewards) that may be stipulated at a test time.

On the other hand, a trajectory transformer is given as the following Equation 3.

$$\pi_\theta(s_t, a_t, r_t, R_t|(s_0, a_0, R_0) \ldots (s_{t-1}, a_{t-1}, r_{t-1}, R_{t-1})) \quad \text{[Equation 3]}$$

Here, when state, action, reward, and Rt are discretized, a modified beam search may be used to approximate a trajectory that maximizes the reward at a test time.

The OCEAN model 600 is trained with user experience that includes a goal to be achieved and implies useful resources for all service-related tasks without additional finetuning for the model and thus, may personalize any service based on user experience. Here, if necessary, it is possible to be optimized to a model service through model tuning such as finetuning.

Figure 9:
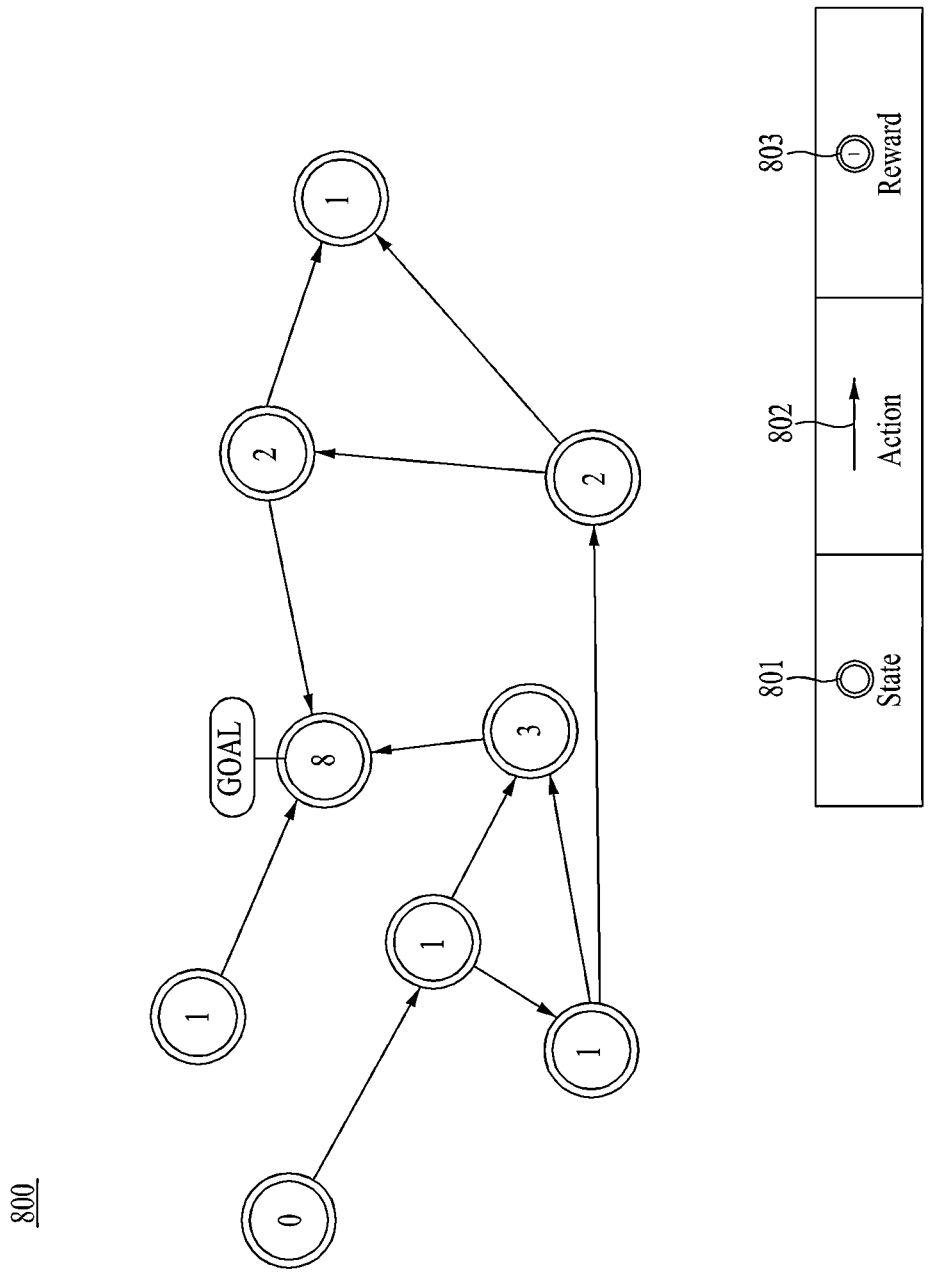
FIGS. 9 and 10 illustrate examples of a process of finding an optimal path through a model that is trained by representing a user experience as a path according to at least one example embodiment.

Referring to FIG. 9, the processor 220 may build the OCEAN model 600 through reinforcement learning for the path 800 by representing each user experience that achieves the same goal as the path 800 that includes the state 801, the action 802, and the reward 803.

Figure 10:
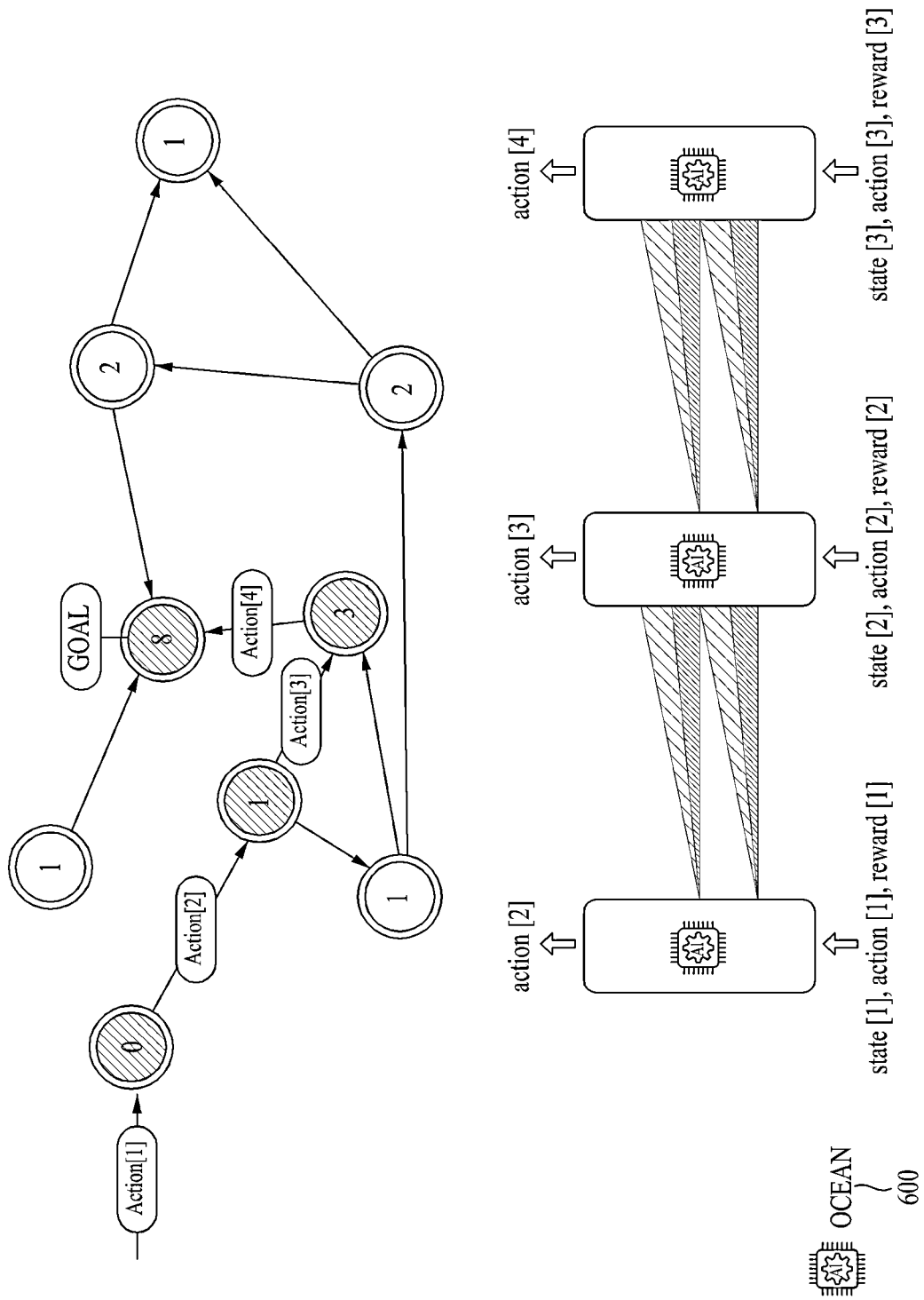

Various paths are present to achieve a goal and the processor 220 may find an optimal path while predicting a subsequent action using the OCEAN model 600. Referring to FIG. 10, the processor 220 may find and recommend the optimal path to achieve the goal using the OCEAN model 600.

A past action and state history sequence (state[0], state[1], . . . , state[n−1], action[0], action[1], . . . , action [n−1]) of a user that reaches a current state in a single session is an input of the OCEAN model 600, and a last state-action pair (state[n] based on action[n]) is an output of the OCEAN model 600. In action[n], n denotes a number of actions attempted by the user to achieve a single goal.

In the OCEAN model 600, not only a previous log alone but also all user action trajectories in the same session, that is, all paths (state, action, reward) of a previous history affect prediction of a subsequent action. For example, action [2] may be predicted using state[1], action [1], and reward[1], action [3] may be predicted using state[1], state[2], action [1], action [2], reward[1], and reward[2], and action [4] may be predicted using state[1], state[2], state[3], action [1], action [2], action [3], reward[1], reward[2], and reward[3].

Hereinafter, example embodiments of providing an optimal path using expert knowledge are described.

The example embodiments may provide a universal advisor (hereinafter, UA) service as one of services that may be implemented using the OCEAN model 600.

The UA service may be implemented in a bottom-up approach. That is, paths may be gathered to become one experience, experiences may be gathered to become one advisor, and advisors may be gathered to complete a universal advisor.

The UA service may appear at a necessary moment throughout a search flow based on personalized information and may provide a guide for achieving a goal.

Figure 11:
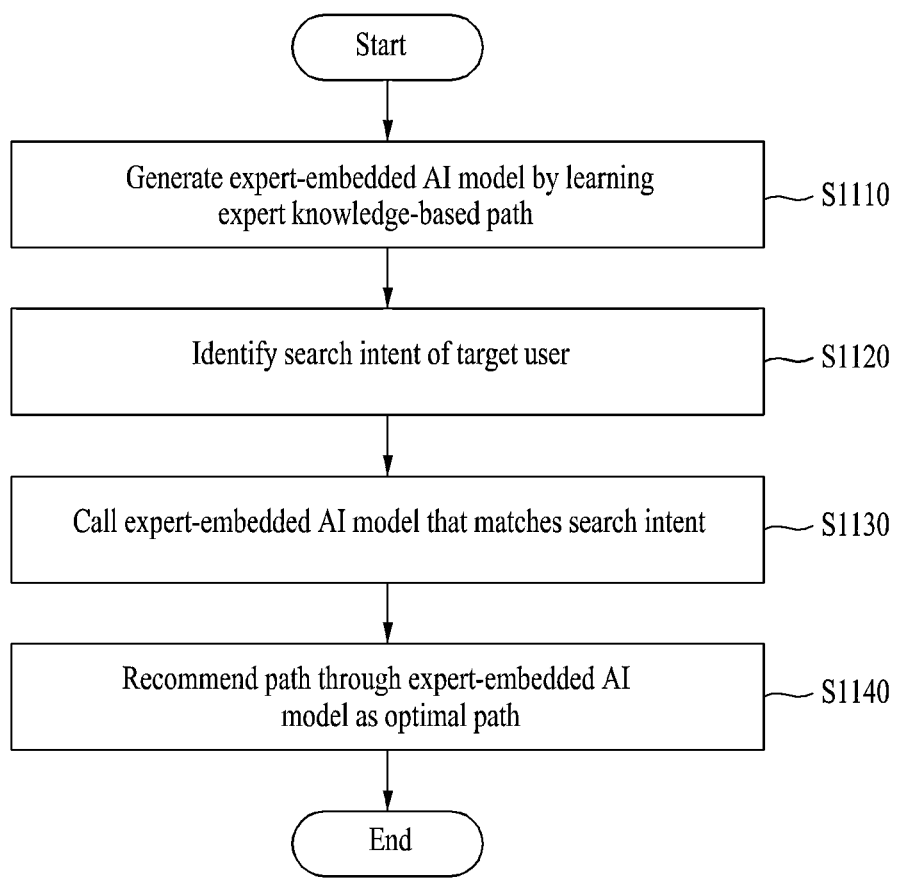
FIG. 11 is a flowchart illustrating an example of a process of providing an optimal path using expert knowledge according to at least one example embodiment.

FIG. 11 is a flowchart illustrating an example of a process of providing an optimal path using expert knowledge according to at least one example embodiment.

Referring to FIG. 11, in operation S1110, the processor 220 may generate an expert-embedded AI model through learning based on an expert knowledge-based path. The processor 220 may collect an experience of a user that achieves a goal based on expert knowledge of a corresponding category for each expert category (e.g., interior design, fashion, food, law, etc.). For example, the processor 220 may track all action trajectories of an expert in a session as a user experience by the expert, may collect a series of all experiences in the corresponding session as a single set of sample data, and may use the same as training data for model training. For example, for a goal of purchasing a table, the processor 220 may collect an expert knowledge-based path by extracting user record session data related to a path through which a user corresponding to an interior design expert purchases a table. As another example, the processor 220 may collect a path determined as correct answer data in consideration of a rule defined as expert knowledge. For example, to develop expert knowledge for an interior design expert, the processor 220 may define interior design items, such as an interior design element (e.g., a material, a texture, a color, a shape), a space style (e.g., natural, modern, vintage, Scandinavian, etc.), a type of space (e.g., a living room, a kitchen, a bedroom, a bathroom, an entrance hall, etc.), and the like, and may define a rule that is a standard for judging a good interior design when an expert changes a space in consideration of each item. The processor 220 may collect an expert knowledge-based path based on an image set that is determined as a good interior design to be suitable for a rule of the interior design expert. The processor 220 may collect a path for each expert category, may classify each of the collected paths into a corresponding category, may learn the classified paths, and may generate an expert-embedded AI model for each expert category. Therefore, the processor 220 may generate an expert-embedded AI model for a UA service by modeling user experience to which expert knowledge is applied. When representing a user experience collected as a user log for a service as a path in a form of a graph, the processor 220 may represent an expert experience as a path in the same network by including the expert experience.

In operation S1120, the processor 220 may identify a search intent of a corresponding user based on user record session data collected in a current session of a target user. The processor 220 may define a state extracted from user log data in a session and a last state of a corresponding session during an action as a latent goal of the user. Using a model that learns a state and action trajectory of a session having succeeded in achieving a goal, the processor 220 may predict a subsequent action of the target user, and may identify the latent goal of the target user from previous action patterns of other users based on a prediction result. The processor 220 may determine a moment at which the UA service is necessary according to the search intent of the target user. When the latent goal of the target user is verified, the processor 220 may determine whether an expert path is included in a plurality of paths for achieving the corresponding goal.

In operation S1130, when it is determined as the moment at which the UA service is required according to the search intent of the target user, the processor 220 may call an expert-embedded AI model that matches the search intent. For example, when an interior design expert path is found from among previous paths that have achieved a corresponding goal for the latent goal verified as the search intent of the user, the processor 220 may determine that it is the moment at which the UA service is required and may call an interior design expert-embedded AI model that is trained with an interior design expert path.

In operation S1140, the processor 220 may recommend a path through the expert-embedded AI model as one of the optimal paths for the target user. The processor 220 may provide the UA service according to the search intent of the target user. Here, the UA service may guide the user through an expert path corresponding to the current state of the user through the expert-embedded AI model.

The processor 220 may predict a subsequent action of the corresponding user based on a history from a current session with respect to the target user and, through this, verify the latent goal indicating the search intent of the user. The processor 220 may request the user for information required to provide a subsequent state based on a path for achieving the latent goal of the user and may provide a subsequent state as an optimal path according to a user input to this request.

Figure 12:
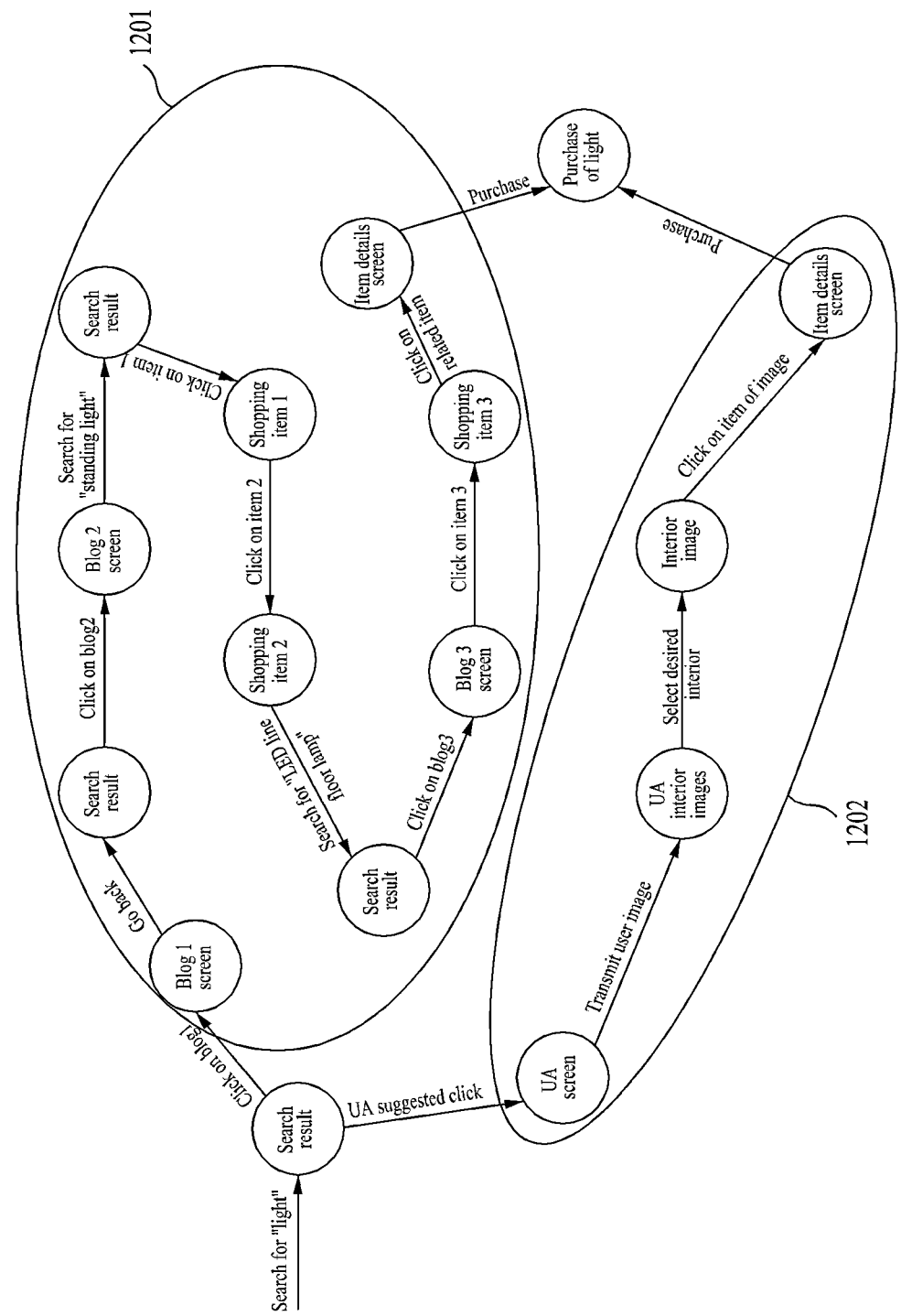
FIG. 12 illustrates an example of a path configuration that includes an expert experience according to at least one example embodiment.

FIG. 12 illustrates an example of a path configuration that includes an expert experience according to at least one example embodiment.

To provide a UA service, modeling may be performed by representing not only a general user experience but also an expert experience as a path in a form of a graph.

Referring to FIG. 12, the processor 220 may model a general user experience 1201 of purchasing a lamp through a general product search path and an expert experience 1202 of purchasing a lamp through a path defined as expert knowledge, as a user experience of achieving a common goal of purchasing a lamp.

When the same lamp purchase is verified as a latent goal of a target user, the processor 220 may recommend a search path by the general user experience 1201 and may also recommend a search path by the expert experience 1202 through a UA service for the target user.

Figure 13:
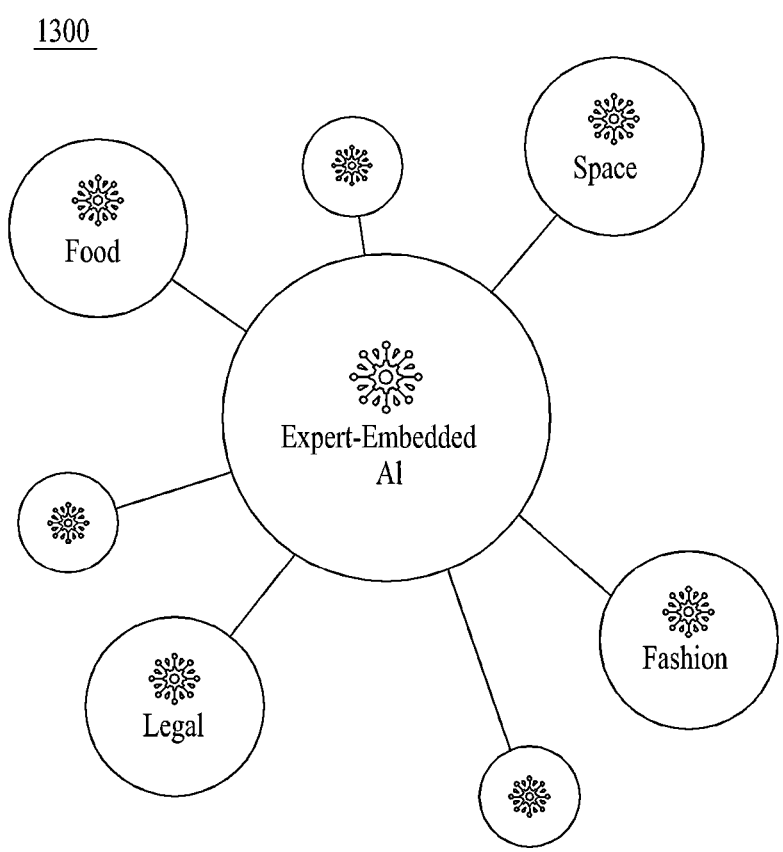
FIG. 13 illustrates an example of an expert-embedded artificial intelligence (AI) model according to at least one example embodiment.

The processor 220 may build an expert-embedded AI model by modeling the expert experience 1202 for the UA service. Referring to FIG. 13, an expert-embedded AI model 1300 may include AI models in various fields, such as interior design (space), fashion, food, and legal. The processor 220 may verify the latent goal of the target user and may provide the UA service using an AI model corresponding to the latent goal.

A new path that may not be generated from the general user experience 1201 may be generated through the expert-embedded AI model 1300. Here, the expert experience 1202 may be applied to the OCEAN model 600 in a form of applying a relatively high reward compared to the general user experience 1201 in a modeling process.

The expert-embedded AI model 1300 may be constructed as an independent model for each category and may operate by selecting and calling the expert-embedded AI model 1300 that matches the search intent of the user.

FIGS. 14 to 17 illustrate examples of a UA service scenario according to at least one example embodiment.

Figure 14:
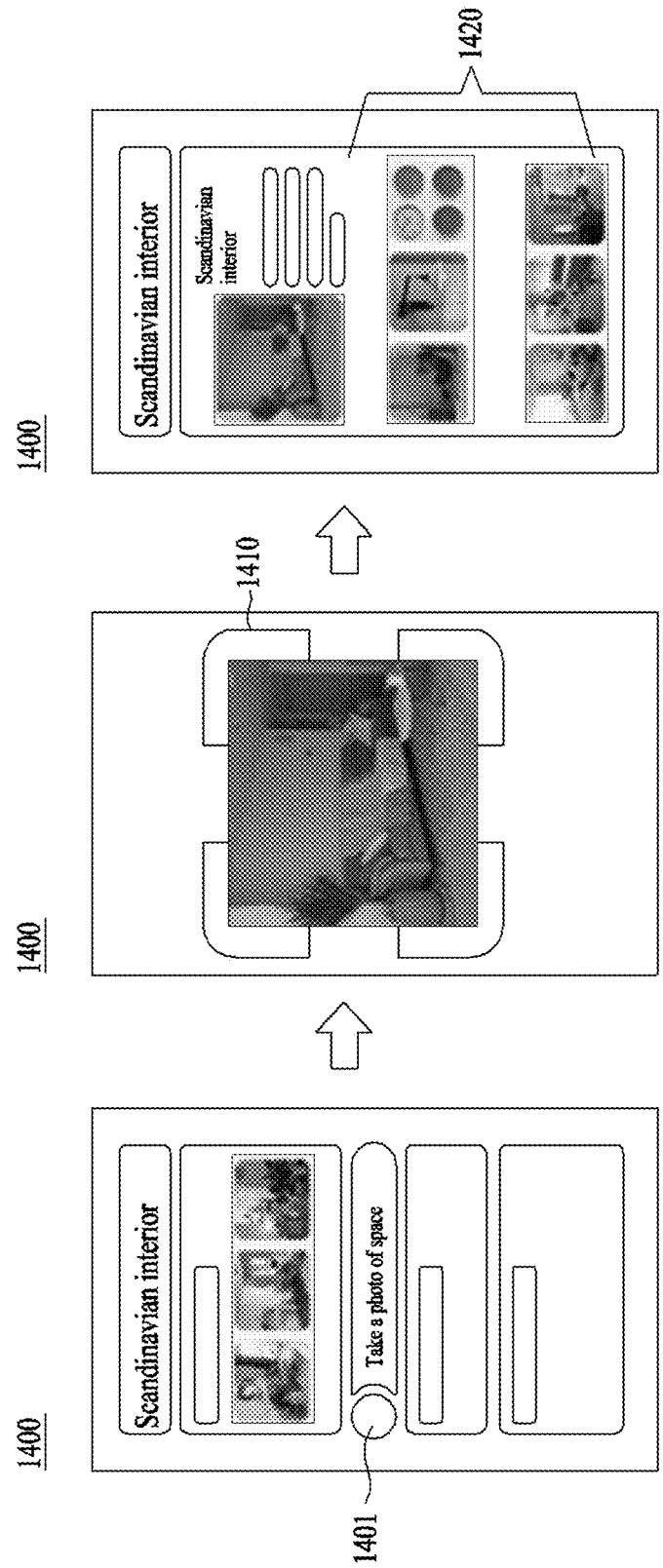
FIGS. 14 to 17 illustrate examples of a universal advisor (UA) service scenario according to at least one example embodiment.

FIG. 14 illustrates an example of a UA service scenario related to interior design.

When a user uses a search service with a search term "Scandinavian interior," the processor 220 may verify the intent of the user that desires to change a space of the user into a Scandinavian styled interior based on a current state (a search term and a history from a current search session) of the user. When the search intent of the user belongs to an expert category, the processor 220 may provide a UA service of a corresponding category. For example, when the current state of the user is the expert category, the processor 220 may determine that it is the moment at which the UA service is required.

An interior design expert-embedded AI model models an interior design expert knowledge-based experience and the UA service using the interior design expert-embedded AI model may make an expert knowledge-based recommendation through an understanding process of extracting interior space information from an input image and detecting an object in the space by requesting the user for an image of an interior space, a reasoning process of analyzing the interior space information of the input image and the object detection result by applying a rule defined as interior design expert knowledge thereto, and a decision-making process of determining a recommendation solution suitable for the analysis result.

Referring to FIG. 14, when it is determined that the UA service by the interior design expert is required from the search intent of the user, the processor 220 may display a UA interface 1401 on a search result screen 1400 corresponding to a search term "Scandinavian interior."

The processor 220 may discover a path optimized for the search intent of the user through the OCEAN model 600 and may request the user to input an image of an interior space to perform the same. In response to a selection on the UA interface 1401 on the search result screen 1400, the processor 220 may provide an image input interface 1410 to request an image input. The processor 220 may add an image input through the image input interface 1410 to a current state of the user and may recommend an interior result 1420 suitable for the space of the input image as a path corresponding to a user state through the search result screen 1400.

Figure 15:
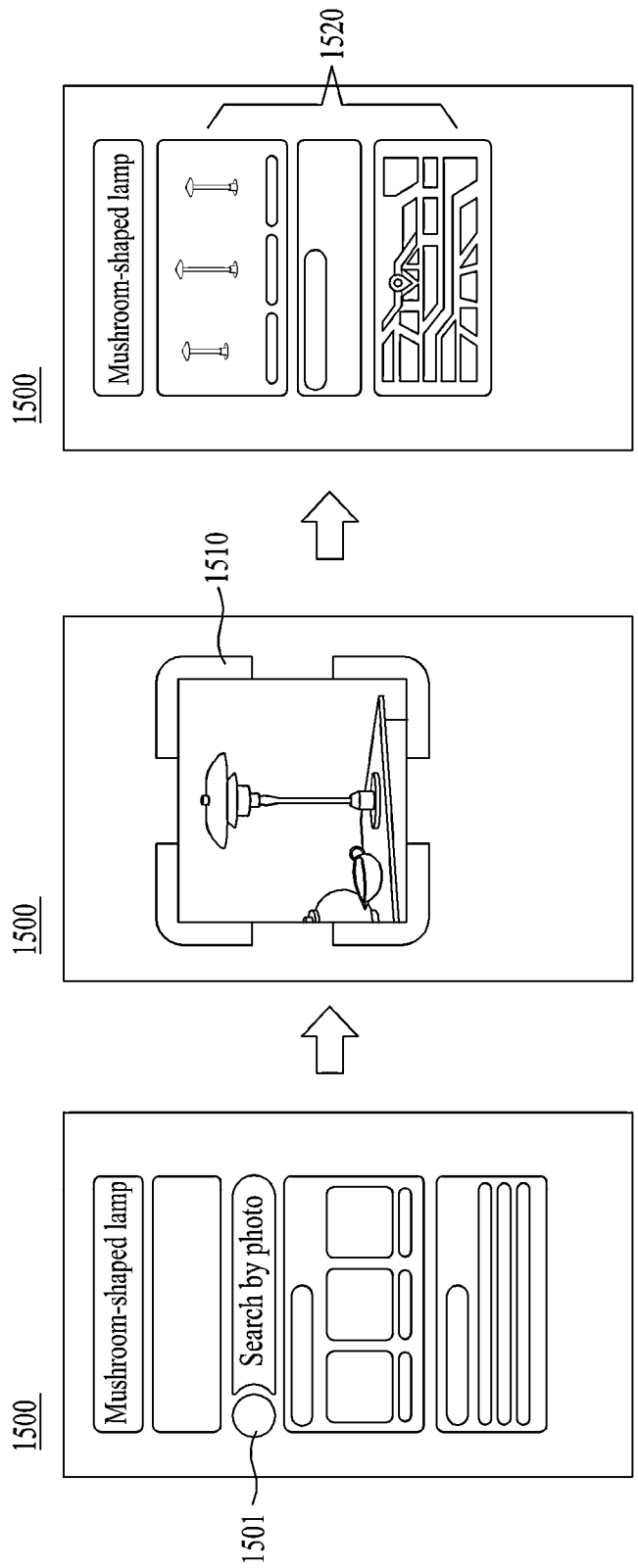

FIG. 15 illustrates an example of a UA service scenario related to shopping.

When the user inputs a search term "mushroom-shaped lamp" in a state in which the user desires to purchase a specific product but does not have specific information on the product, the intent of the user may be verified based on the search term or history from a current search session.

Referring to FIG. 15, when it is the moment at which a UA service by a shopping expert is required from a search intent of the user, the processor 220 may display a UA interface 1501 on a search result screen 1500 corresponding to the search term "mushroom-shaped lamp."

Not only a user experience that achieves a lamp purchase but also an expert experience may be included and modeled. The processor 220 may discover an expert path through the OCEAN model 600 and may request an image input for a product to be purchased to perform the same. In response to a selection on the UA interface 1501 on the search result screen 1500, the processor 220 may provide an image input interface 1510 and may request an image input. The processor 220 may add an image input through the image input interface 1510 to a current state of the user and may recommend shopping information (e.g., product details information, a product homepage, a product purchase page, company information, etc.) 1520 on the product of the input image as a path corresponding to the user state through the search result screen 1500.

The processor 220 may suggest an optimal path capable of easily and quickly achieving a goal by skipping an unnecessary stage through the UA service although the user does not go through a multistage search process to find product information.

The processor 220 may understand the user intent based on the current state of the user, such as the search term or history from the corresponding session and may suggest a result beyond a platform according to the user intent. For example, when the user searches for "how to remove coffee stains" in a situation in which the user spilled coffee on the clothes, the processor 220 may identify the latent goal of the user that desires to remove the coffee stains and may connect a search service of providing a search result including a document with a method of removing coffee stains, a shopping service for purchasing a detergent used to remove coffee stains, a location-based service for providing a list of nearby laundries based on a current location of the user, and the like. That is, the UA service may aggressively guide the user to achieve a goal by crossing a plurality of platforms, such as the search service, the shopping service, and the location-based service.

The processor 220 may also perform "common sense" or commonly used reasoning as the UA service. If the user uploads an image of a shirt stained with coffee instead of using a search term, the processor 220 may suggest a path of identifying a latent goal of removing stains as common sense reasoning through an image analysis and then achieving the corresponding goal.

In the OCEAN model 600, a user experience is modeled as a path in a form of a graph. For example, a final result reached by the user for a search term "when my head hurts" may be learned as search history data and a final result selected by many users may become "common sense." Since such a user experience is learned, the final result may be predicted based on the common sense of users for the input search term "when my head hurts." Numerous final results resulting in common sense, such as "I take a medicine when I have a headache," "I eat when I am hungry," and "I use an umbrella when it rains" may be applied to the OCEAN model 600. The UA service using the OCEAN model 600 may provide an optimized experience through common sense reasoning.

The processor 220 may actively provide a notification for a goal the user has not achieved in the past session in a multi-domain or a cross-platform. For example, when the user fails in purchasing a desired product due to the product being out of stock in a shopping service, the UA service may notify the user when the corresponding product is stocked while monitoring a status of the product.

There may be various criteria for determining whether a goal is achieved by the user. For example, when the user purchases a product after conducting a search, when the user is directed to a corresponding page and stays there for a desired period of time or more after conducting a search, it may be determined that the goal is achieved.

In a process of constructing the OCEAN model 600, the last status (e.g., whether many users terminated a search session in a product search page, whether many users terminated a search session after purchasing a product, etc.) in action history data of the user may be probabilistically learned. That is, a probability that a corresponding state is the last state in which a goal is achieved may be learned for each state.

If the user terminates a session in a state in which a corresponding state is not highly likely to be the last state, it may be considered that the user has not achieved a goal. Whether the user has achieved the goal may be verified by continuously monitoring whether an action sequence and the current state of the user correspond to the last state.

One of the most important elements for guiding the user through an optimal path for achieving a goal is personalization. A level of understanding a user state may act as an important factor in determining a recommendation.

Figure 16:
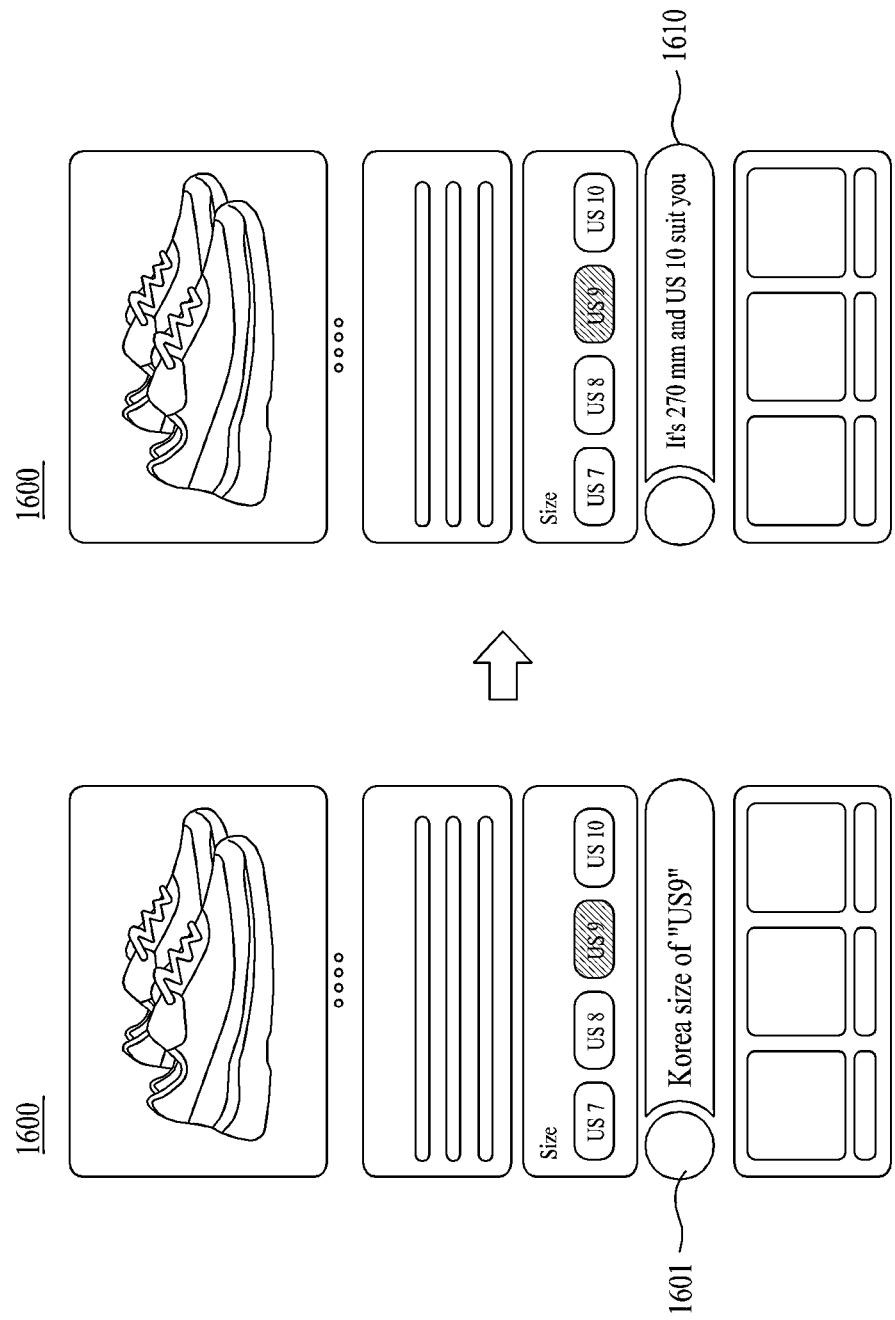
Figure 17:
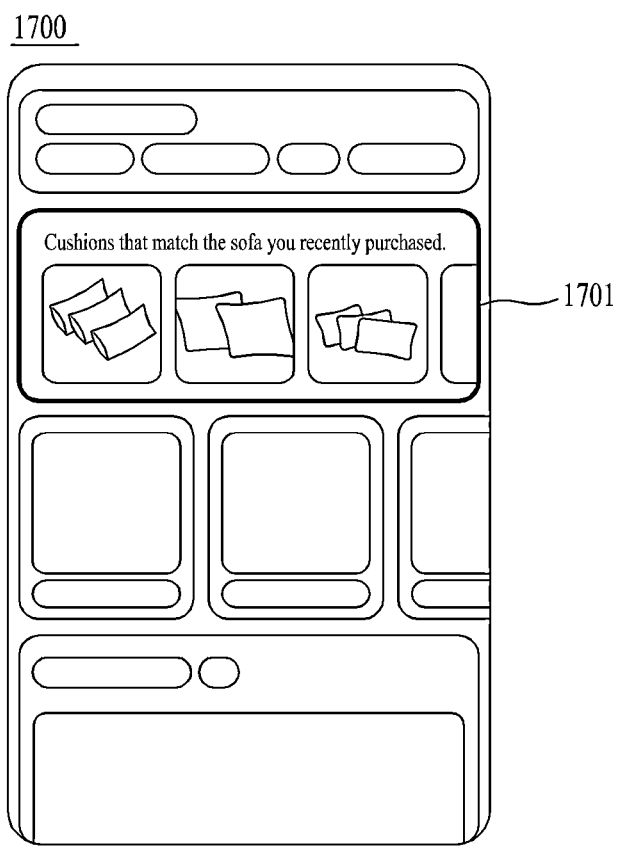

FIGS. 16 and 17 illustrate examples of a UA service scenario that considers a user state.

The processor 220 may recognize a current state of a user and may provide additional information through the UA service. FIG. 16 illustrates a product details screen 1600. If a user with a Korean nationality residing in Korea is searching for a product of which a shoe size is marked in US standards, the processor 220 may determine that the UA service is required and may display a UA interface 1601 on a product details screen 1600.

If the user resides in the United States or has a US nationality, displaying the UA interface 1601 on the product details screen 1600 is omitted.

In response to a selection on the UA interface 1601 on the product details screen 1600, the processor 220 may provide a Korean size standard as additional information 1610 corresponding to the current state of the user or may recommend a size suitable for personal information of the user on the product details screen 1600.

The processor 220 may provide the UA service through a further optimized path as personal information, such as a shoe size, a preferred color, and a preferred brand of the user accumulated as a user state in the OCEAN model 600.

FIG. 17 illustrates a shopping service screen 1700. When the user has a recent history of purchasing a sofa and an interior-related keyword search, such as interior, light, and rug, increases, a user state may be defined based on this history. In a process in which the user consumes or interacts with a shopping service screen 1700, the processor 220 may provide a UA interface 1701 that includes additional information related to the user state on the shopping service screen 1700 using an interior design expert-embedded AI model.

Also, the user state may be defined based on a recent search term, a preferred brand, and weather information with respect to a user that recently went on a diet and searches for training clothes for the purpose of exercise and related information may be recommended for the user using at least one of a fashion expert-embedded AI model and a food expert-embedded AI model.

That is, the processor 220 may define a user action history in a current session or during a recent desired period of time, user's environmental information (e.g., time, location, weather, and season), user's personal information (e.g., age, gender, and taste) as a current state of the user and may guide the user through a personalized path accordingly.

Therefore, the processor 220 may provide a more accurate and useful recommendation using expert-embedded AI models of a plurality of domains and may identify a user state and provide information required for a current state. In this manner, the processor 220 may recommend a different path for each user.

Conventionally, recommendation information is provided according to a rule defined by a service provider, whereas the UA service using the OCEAN model 600 may provide personalized recommendation information according to a user state defined based on a user history through an AI model.

That is, the UA service using the OCEAN model 600 may predict a goal through a user experience and may guide a user through an optimal path, and may also provide a result according to further various variables. By directly modeling an expert knowledge-based experience as well as a general user experience, it is possible to cope with all situations and to connect to a new service through expansion of a path.

According to some example embodiments, it is possible to find a pattern from a user action using an AI model and to recommend an optimal path to a user destination capable of skipping unnecessary steps. In particular, according to some example embodiments, it is possible to build a hyper-personalized model for optimal path prediction and to build a platform that does not depend on a specific domain or service by representing user experience as a path and modeling the same. Also, according to some example embodiments, it is possible to guide a user through an optimal user experience capable of more quickly reaching a user destination by recommending a path represented as expert knowledge as a path suitable for user intent.

The systems or apparatuses described herein may be implemented using hardware components, software components, and/or a combination thereof. For example, the apparatuses and the components described herein may be implemented using one or more general-purpose or special purpose computers or processing devices, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media may continuously store computer-executable programs or may transitorily store the same for execution or download. Also, the media may be various types of recording devices or storage devices in a form in which one or a plurality of hardware components are combined. Without being limited to a media directly connected to a computer system, the media may be distributed over the network. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software. Examples of program instructions include both machine code, such as produced by a compiler, and files containing higher level code that may be executed by the computer using an interpreter.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for providing an optimal path to a goal performed by a computer device having at least one processor configured to execute computer-readable instructions included in a memory, the method comprising:
predicting a subsequent action of a target user through a general optimal path prediction model that is trained in a form of a graph representing a plurality of general user action trajectories of a session in which a plurality of paths of a plurality of general users extends through a plurality of services on a corresponding plurality of domains and an expert-embedded artificial intelligence (AI) model trained based on an expert knowledge-based path of an expert user in a session in which the expert user has expert knowledge, and recommending a path of the predicted action as the optimal path to the goal, wherein the recommending of the path of the predicted action includes, identifying a user intent based on a previous action trajectory of the target user in a current session; and determining a path corresponding to the user intent as the optimal path through the plurality of paths of the plurality of general users and through the expert knowledge-based path of the expert user responsive to a determination from the user intent that the expert knowledge of the expert user should be applied.

2. The method of claim 1, wherein the expert knowledge-based path is determined as correct answer data in consideration of a rule defined as the expert knowledge of the expert user.

3. The method of claim 1, wherein the expert knowledge-based path corresponds to a category with respect to each expert category, and the determining of the path corresponding to the user intent comprises guiding the expert knowledge-based path through an expert-embedded AI model of a category suitable for the user intent.

4. The method of claim 1, wherein the path of the predicted action includes a state at each time step, an action in the state, and a reward for the action, and the state is defined with contents related to a service screen consumed by a user and further includes at least one of a service type, user-related environmental information, user's personal information, and a session category, the action is defined as a user activity in the state, and the reward is defined as a user satisfaction for the action.

5. The method of claim 4, wherein a relatively high reward is applied to the expert knowledge-based path.

6. The method of claim 1, wherein the determining of the path through the expert knowledge-based path corresponding to the user intent comprises displaying an interface for guiding the expert knowledge-based path on a service screen of the current session.

7. The method of claim 6, wherein the determining of the path through the expert knowledge-based path corresponding to the user intent further comprises requesting a user input related to the user intent through an interface for guiding the expert knowledge-based path.

8. The method of claim 7, wherein the determining of the path through the expert knowledge-based path corresponding to the user intent further comprises providing additional information corresponding to the user input as the expert knowledge-based path.

9. The method of claim 1, wherein the determining of the path through the plurality of paths of the plurality of general users and through the expert knowledge-based path corresponding to the user intent comprises defining a current state of the target user and guiding a personalized path based on the current state.

10. The method of claim 9, wherein the current state of the target user is defined as at least one of a user action history of the target user in a current session or a recent desired period, user's environmental information, and user's personal information.

11. A non-transitory computer-readable recording medium storing instructions that, when executed by a processor, cause the processor to implement the optimal path providing method of claim 1.

12. A computer device for providing an optimal path to a goal, comprising:

at least one processor configured to execute computer-readable instructions included in a memory, wherein the at least one processor is configured to predict a subsequent action of a target user through a general optimal path prediction model that is trained in a form of a graph representing a plurality of general user action trajectories of a session in which a plurality of paths of a plurality of general users extends through a plurality of services on a corresponding plurality of domains and an expert-embedded artificial intelligence (AI) model trained based on an expert knowledge-based path of an expert user in a session in which the expert user has expert knowledge, and recommending a path of the predicted action as an optimal search path to the goal, and wherein the recommending of the path of the predicted action includes identifying a user intent based on a previous action trajectory of the target user in a current session and determining a path corresponding to the user intent as the optimal path through the plurality of paths of the plurality of general users and through the expert knowledge-based path of the expert user responsive to a determination from the user intent that the expert knowledge of the expert user should be applied.

13. The computer device of claim 12, wherein the expert knowledge-based path is determined as correct answer data in consideration of a rule defined as the expert knowledge of the expert user.

14. The computer device of claim 13, wherein the expert knowledge-based path corresponds to a category with respect to each expert category, and the at least one processor is configured to guide the user through the expert knowledge-based path through an expert-embedded AI model of a category suitable for the user intent.

15. The computer device of claim 12, wherein the path of the predicted action includes a state at each time step, an action in the state, and a reward for the action, and the state is defined with contents related to a service screen consumed by a user and further includes at least one of a service type, user-related environmental information, user's personal information, and a session category, the action is defined as a user activity in the state, and the reward is defined as a user satisfaction for the action.

16. The computer device of claim 15, wherein a relatively high reward is applied to the expert knowledge-based path.

17. The computer device of claim 12, wherein the at least one processor is configured to display an interface for guiding the expert knowledge-based path on a service screen of the current session.

18. The computer device of claim 17, wherein the at least one processor is configured to request a user input related to the user intent through an interface for guiding the expert knowledge-based path.

19. The computer device of claim 18, wherein the at least one processor is configured to provide additional information corresponding to the user input as the expert knowledge-based path.

20. The computer device of claim 12, wherein the determining of the path corresponding to the user search intent includes guiding a personalized path based on the current state by defining a current state of the target user based on at least one of a user action history of the target user in a current session or a recent desired period, user's environmental information, and user's personal information.

* * * * *